United States Patent [19]
Jiang et al.

[11] Patent Number: 6,026,006
[45] Date of Patent: Feb. 15, 2000

[54] INTEGRATED THREE-PHASE POWER CONVERTER AND METHOD OF OPERATION THEREOF

[75] Inventors: Yimin Jiang; Hengchun Mao, both of Plano, Tex.

[73] Assignee: Lucent Technologies Inc., Murray Hill, N.J.

[21] Appl. No.: 09/157,757

[22] Filed: Sep. 21, 1998

[51] Int. Cl.$^7$ .................. H02M 7/5387; H02M 3/335
[52] U.S. Cl. ........................ 363/132; 363/17; 363/46
[58] Field of Search .................... 363/16, 17, 20, 363/21, 37, 40, 46, 131, 132, 44

[56] References Cited

U.S. PATENT DOCUMENTS

| | | | |
|---|---|---|---|
| 5,255,174 | 10/1993 | Murugan | 363/17 |
| 5,499,178 | 3/1996 | Mohan | 363/39 |

OTHER PUBLICATIONS

Da Feng Weng and S. Yuvarajan, "Resonant Boost Input Three Phase Power Factor Corrector," 1998 IEEE, pp. 958–962.

*Primary Examiner*—Peter S. Wong
*Assistant Examiner*—Rajnikant B. Patel

[57] ABSTRACT

An integrated three-phase power converter and method of operation thereof is provided. The integrated three-phase power converter includes: (1) first and second power switches coupled between corresponding rails of said power converter, (2) an input stage, including first, second and third L-C branches coupled between said first, second and third phase inputs and a node between said first and second power switches, adapted to receive phase voltages from a source of electrical power, and (3) an output stage, coupled to said first and second power switches, that provides a DC output voltage at said output, said first and second power switches cooperating to employ said input stage to reduce input current total harmonic distortion (THD) on all three of said phase inputs and said output stage to convert said phase voltages to said DC output voltage.

20 Claims, 6 Drawing Sheets

INTEGRATED THREE-PHASE POWER CONVERTER AND METHOD OF OPERATION THEREOF

TECHNICAL FIELD OF THE INVENTION

The present invention is directed, in general, to power conversion and, more specifically, to an integrated three-phase power converter and method of operation thereof.

BACKGROUND OF THE INVENTION

Traditionally, power converters have been utilized to provide a regulated DC output voltage from a single-phase or multi-phase AC input. Commonly, AC power is received, then rectified through a rectifier and filtered to furnish the desired DC output voltage. Further, while seeking to make power converters more efficient, today's power supply industry has also become very cost-sensitive, with low production costs being a key to success.

Increasing attention has been focused on input current total harmonic distortion (THD) due to the increasing use of nonlinear loads that tend to degrade three-phase AC line quality. Designers have fashioned many successful circuit configurations for reducing input THD and improving the power factor, commonly called power factor correction (PFC) converters. Recent designs have centered around several two-switch, three-phase PFC converter configurations that improve the input current THD thereof. In many of these power converters, the two switches are arranged in half-bridge configurations.

Another constant goal of power converter designs have been to provide a regulated DC output. Commonly, such an output voltage is generated by using a DC/DC power converter that includes an isolation transformer and a series of switches arranged in various configurations (e.g., half-bridge, full-bridge, etc.). Unfortunately, very little attention has been directed to the coordination and integration of PFC converters and DC/DC power converters. In today's electronics markets, such characteristics are quickly becoming increasingly important considerations during the design process.

Accordingly, what is needed in the art is power converter which combines PFC functions while converting phase voltages to a DC output voltage.

SUMMARY OF THE INVENTION

To address the above-discussed deficiencies of the prior art, the present invention provides an integrated three-phase power converter having low input current THD at first, second and third phase inputs and a well-regulated output and a method of operating the same.

In one embodiment, the power converter includes: (1) first and second power switches coupled between corresponding rails of the power converter, (2) an input stage, including first, second and third L-C series branches coupled between the first, second and third phase inputs of the power converter and a node between the first and second power switches, adapted to receive phase voltages from a source of electrical power and (3) an output stage, coupled to the first and second power switches, that provides a DC output voltage at the output, the first and second power switches cooperating to employ the input stage to reduce input current total harmonic distortion (THD) on all three of the phase inputs and the output stage to convert the phase voltages to the DC output voltage.

The present invention introduces the broad concept of employing a single power train including two power switches in a three-phase power converter, interposed between an input stage and an output stage, to reduce input current THD and to convert phase voltages to a DC output voltage. The three-phase power converter can therefore provide power factor correction and provide a regulated DC voltage at the output of the power converter.

In one embodiment of the present invention, the output stage includes an isolation transformer interposed between the node between the first and second power switches and the output. In a related, but alternative embodiment, the input stage further includes an input rectifier coupled to the first, second and third L-C series branches and the output stage also includes an output rectifier interposed between the node and the output.

In one embodiment of the present invention, the first and second power switches each conduct for a duty cycle of about 50%. The duty cycle relates to the conduction period of the respective switches. In an advantageous embodiment, the switches are controlled complimentarily, with the first switch turned on for about 50% of a switching cycle and the second switch turned on during at least a substantial portion of the remaining switching cycle. The broad scope of the present invention, however, is not limited to a particular conduction interval for the switches. The power switches are generally controlled in a symmetrical manner. The duty cycle or switching frequency, or both may be controlled to provide a well regulated output while maintaining a low input current THD at the three-phase inputs.

In one embodiment of the present invention, the output stage includes first and second split output inductors coupled to the output. The split output inductors may be operated in discontinuous conduction mode (DCM) in order to limit the DC-link voltage fluctuations. The first and second inductors may also be coupled together to reduce flux swing and inductor core loss.

In one embodiment of the present invention, the output stage includes an output capacitor coupled across the output. The output capacitor filters a DC waveform at the power converter output. Those skilled in the art are familiar with such filters.

In one embodiment of the present invention, the power converter further includes third and fourth power switches coupled to the first and second power switches. The addition of the third and fourth power switches allows the power converter to be operated in a full-bridge configuration. Of course, other converter topologies are well within the broad scope of the present invention.

In a related, but alternative embodiment, the first and third power switches conduct during a first interval for a duty cycle of about 50% and the second and fourth power switches conduct during a second interval for a duty cycle of about 50%. However, the broad scope of the present invention is not limited to a particular conduction pattern for the switches. Depending on the particular embodiment of the present invention and application therefor, the switches may have overlapping conduction periods.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
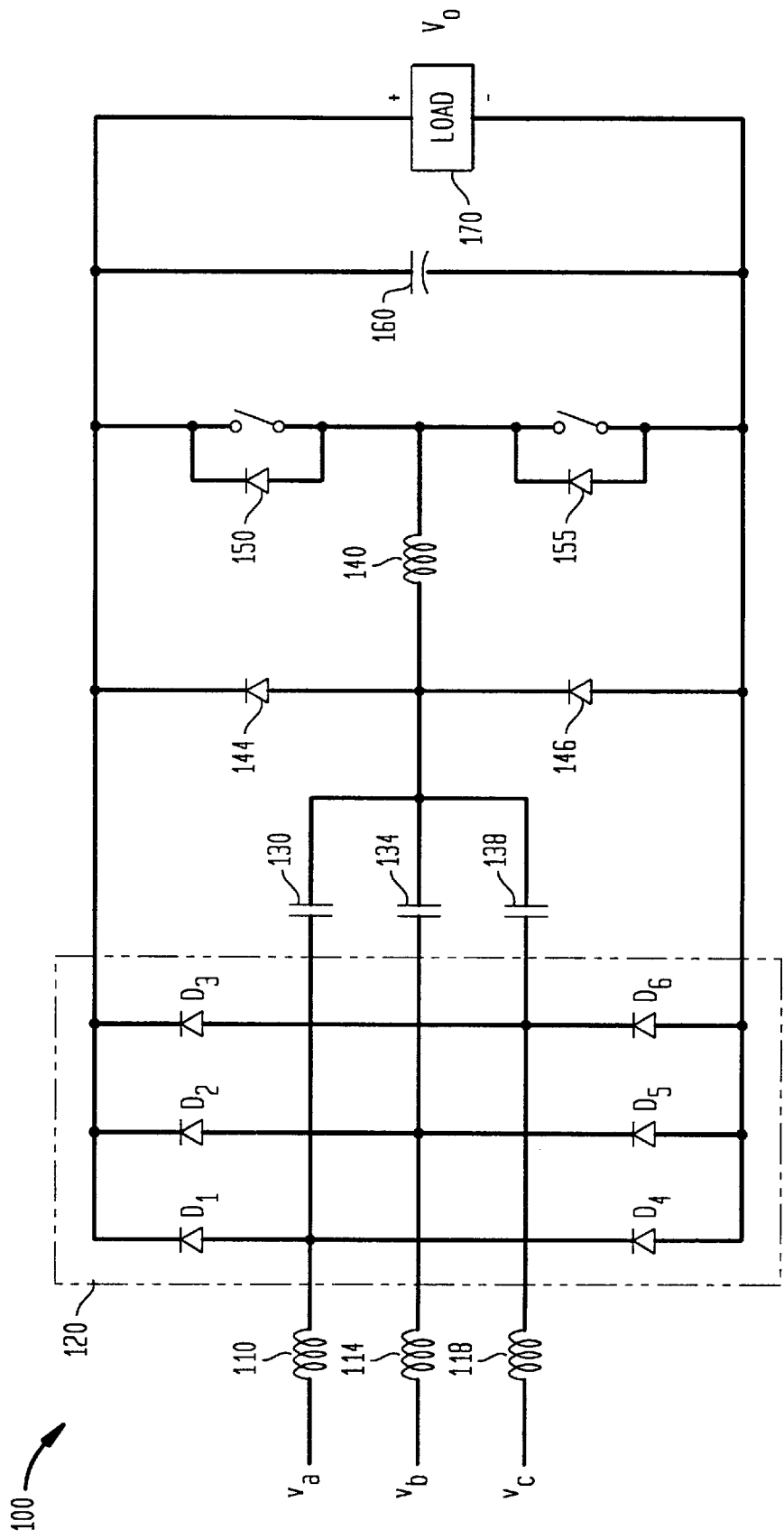
FIG. 1 illustrates a non-isolated three-phase PFC converter.

Referring initially to FIG. 1, illustrated is a non-isolated three-phase PFC converter. The power converter 100 receives input power from a AC voltage source in three phases Va, Vb, Vc through first, second and third boost inductors 110, 114, 118, respectively. The inductors 110, 114, 118 are coupled to a three-phase rectifier 120 that includes a plurality of diodes D1–D6 arranged in a full bridge configuration and to first, second and third input capacitors 130, 134, 138.

A resonant inductor 140 is coupled to the first, second and third input capacitors 130, 134, 118 and to a node between the first and second switches 150, 155. First and second coupling diodes 144, 146 are coupled between the resonant inductor 140 and the positive and negative rails of the rectifier 120, respectively. Further, the first and second switches 150, 155 are coupled to the positive rail and to the negative rail of the rectifier 120, respectively. An output capacitor 160 is coupled across the first and second switches. Finally, an output voltage Vo is measured across a load 170 that is coupled in parallel with the output capacitor 160. Those skilled in the art will understand and appreciate the operation of the PFC converter.

Figure 2:
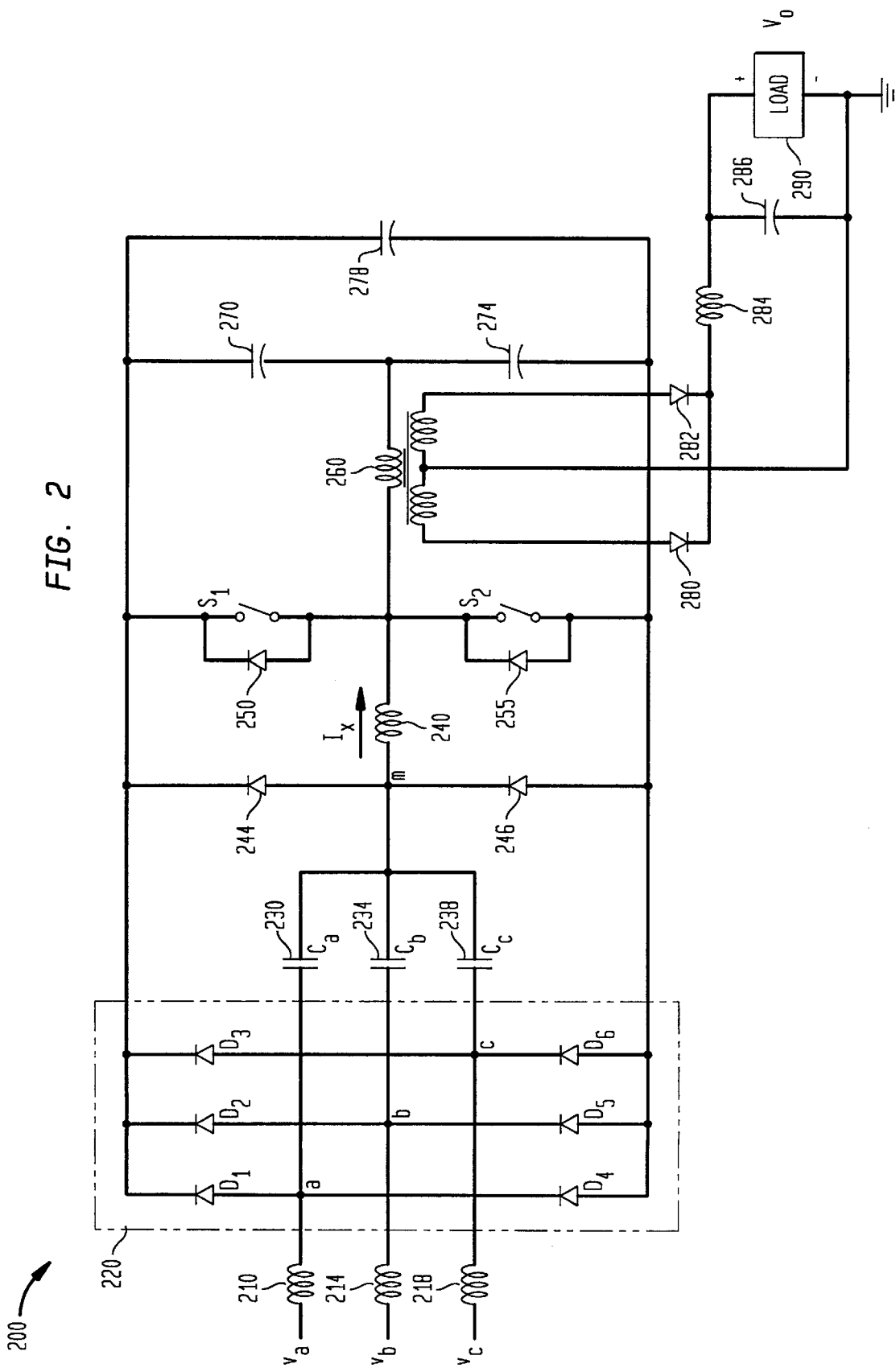
FIG. 2 illustrates a three-phase power converter constructed according to principles of the present invention.

Turning now to FIG. 2, illustrated is a three-phase power converter constructed according to principles of the present invention. The power converter 200 includes first and second power switches 250, 255 coupled between an input stage and an output stage. The input stage includes a PFC topology and includes first, second and third boost inductors 210, 214, 218 that receive input power from an AC voltage source in three phases Va, Vb, Vc. Additionally, the three phases also produce phase input currents Ia, Ib, Ic. The inductors 210, 214, 218 are coupled to a three-phase input rectifier 220 that includes a plurality of diodes D1–D6 arranged in a full bridge configuration and to first, second and third input capacitors 230, 234, 238.

A resonant inductor 240 is coupled to the first, second and third input capacitors 230, 234, 218 and to a node between the first and second switches 250, 255. First and second coupling diodes 244, 246 are coupled between the resonant inductor 140 and the positive and negative rails of the rectifier 220, respectively. A measurement node m is located between the first and second coupling diodes 244, 246. The first, second and third input capacitors 230, 234, 238, in combination with the resonant inductor 240 form first, second and third L-C branches. Further, the first and second power switches 250, 255 are coupled to the positive rail and to the negative rail of the rectifier 220, respectively. Of course, those skilled in the art will readily recognize that other L-C branch configurations adapted to facilitate power factor correction may also be employed in the input stage.

The output stage of the power converter 200 includes an isolation transformer 260 and constitutes a DC/DC conversion section. The primary winding of the isolation transformer 260 is coupled to the node between the first and second power switches 250, 255 and to a node between first and second filter capacitors 270, 274. Additionally, a third filter capacitor 278 is coupled across the first and second filter capacitors 270, 274. The filter capacitors are further coupled to the first and second power switches 250, 255.

The outer taps of the secondary winding of the isolation transformer 260 are coupled to an output rectifier that includes first and second rectifying diodes 280, 282, which are further coupled to an output inductor 284. An output capacitor 286 is coupled to the output inductor 284 and to the center tap of the secondary winding of the transformer 260. Finally, a load 290 is coupled in parallel with the output capacitor 286.

The first and second power switches 250, 255, in an advantageous embodiment, are operated complementarily with duty cycles of about 50%. It should be noted that the duty cycles of the first and second power switches 250, 255 may be varied and may be used to control the power level of the power converter 200. In another advantageous embodiment, the switching frequency of the power switches 250, 255 may be used to control the input power level of the power converter 200. However, the turn-on times for the first and second power switches 250, 255 are commonly 180° out of phase so the output current has the benefit of interleaving control.

Figure 3A:
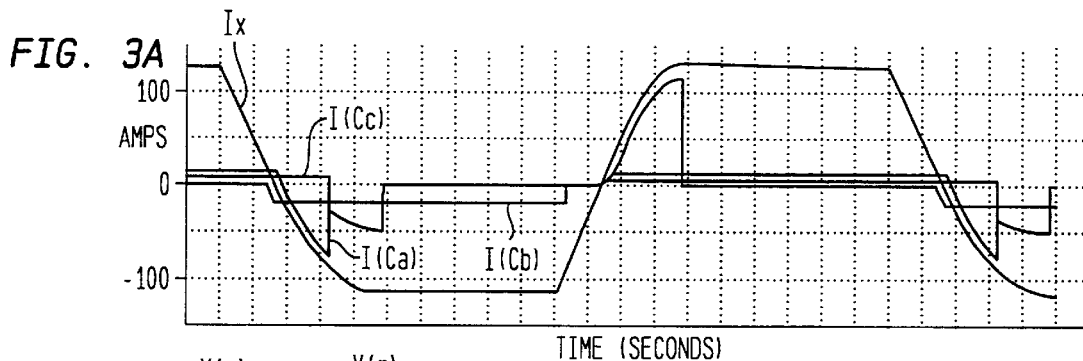
FIGS. 3A–3E illustrate current and voltage waveforms for the power converter of FIG. 2 during an exemplary switching cycle.
Figure 3B:
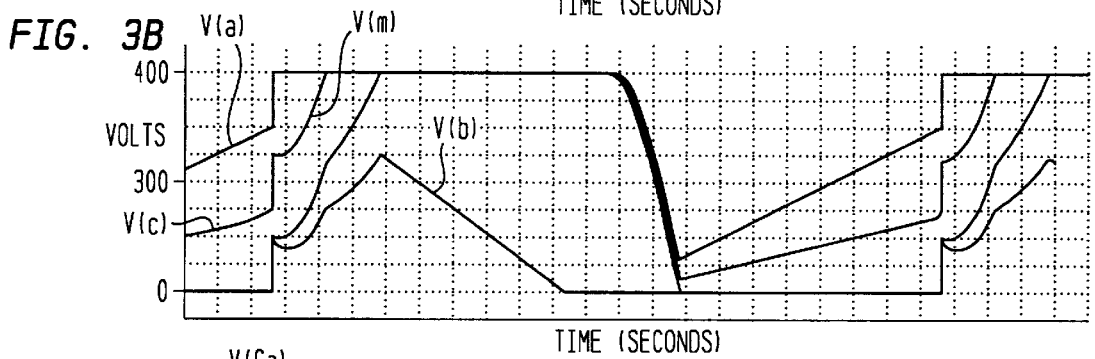
Figure 3C:
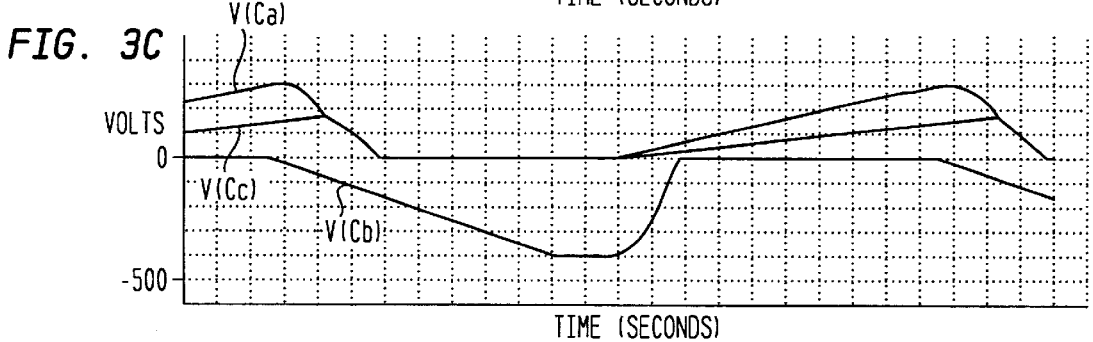
Figure 3D:
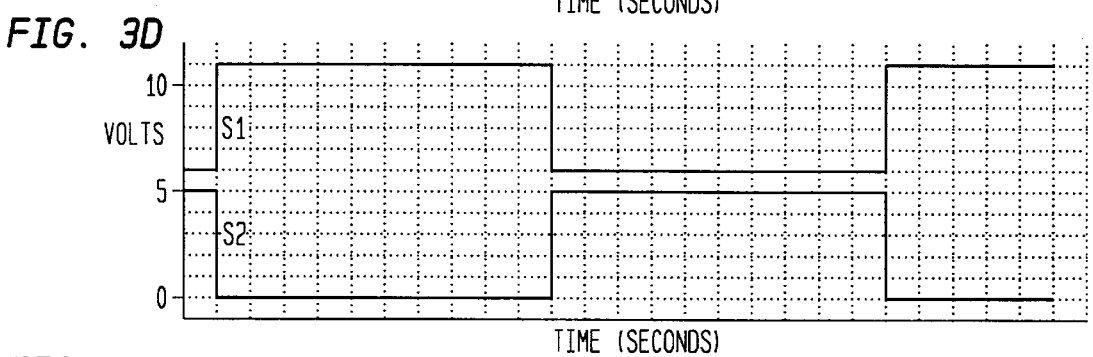
Figure 3E:
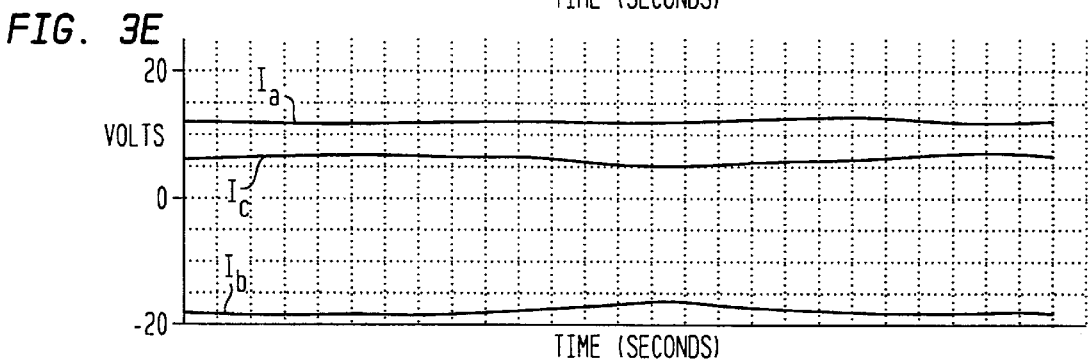

Turning now to FIGS. 3A–3E, illustrated are current and voltage waveforms for the power converter 200 of FIG. 2 during an exemplary switching cycle. FIG. 3A displays current waveforms I(Ca), I(Cb), I(Cc) of the first, second and third input capacitors Ca, Cb, Cc and the current Ix through the resonant inductor 240. FIG. 3B shows the voltage waveforms V(a), V(b), V(c) of the three input nodes and the voltage V(m) at the measurement node m. FIG. 3C displays voltage waveforms V(Ca), V(Cb), V(Cc) of the first, second and third input capacitors Ca, Cb, Cc. FIG. 3D illustrates the drive voltages of the first and second power switches S1, S2 during an exemplary switching cycle. Finally, FIG. 3E illustrates the current waveforms of the three input phase currents Ia, Ib, Ic during the switching cycle.

With continuing reference to FIG. 2 and assuming that the instantaneous phase voltages and currents satisfy the conditions of Va>Vb>0>Vc and Ia>Ib>0>Ic and the two switches 250, 255 are controlled with a duty cycle of about 50% (i.e., the power converter is in frequency control mode), a typical switching cycle of this power converter 200 will hereinafter be discussed.

At the end of the conduction period of the second power switch 255, the resonant inductor current Ix is positive. The first and third phase currents Ia, Ic are conducted through the first and third input capacitors 230, 238, while the second phase current Ib is conducted through fourth diode D4. The second coupling diode 246 is also conducting during this time. The first and third input capacitors Ca, Cc have positive voltages V(Ca), V(Cc) and the voltage V(Cb) across the second input capacitor Cb is zero.

Once the second power switch 255 is turned off, the first power switch 250 is turned on. The DC-link voltage across the third filter capacitor 278 is applied to the resonant inductor 240, forcing the its current Ix to reduce and move towards a negative value. When the resonant inductor current Ix is lowered to the sum of the first and third phase currents Ia, Ic, the second coupling diode 246 stops conducting, thus causing the voltage V(m) at the measurement node m to increase towards the positive rail of the rectifier 220. As a result, because the voltage V(Ca) across the first input capacitor Ca is close to the DC-link voltage, the first diode D1 starts to conduct. The voltages V(Ca), V(Cc) across the first and third input capacitors Ca, Cc decrease due to LC resonance and the voltage V(Cb) across the second input capacitor Cb continually increases in magnitude.

When the voltage at a node between the third boost inductor 218 and the third input capacitor 238 reaches the DC-link voltage, the third diode D3 starts to conduct. As a result, the voltages V(Ca), V(Cc) across the first and third input capacitors Ca, Cc continue to decrease until reaching zero. At this point, the first coupling diode 244 begins to conduct, clamping the voltage V(m) at the measurement node m to the positive rail of the rectifier 220. The second phase current Ib continually discharges the third input capacitor Cc until the fourth diode D4 begins to conduct.

During the entire interval when the first power switch 250 is conducting, the voltage of the first filter capacitor 270 is applied to the primary winding of the isolation transformer 260. The magnitude of the current through the first power switch 250 is the sum of the transformer primary current and the resonant inductor current Ix. Power is therefore transferred to the secondary winding of the transformer through the first power switch 250.

Once the first power switch 250 is turned off and the second power switch 255 is turned on, the DC-link voltage starts to charge the resonant inductor 240, causing the resonant inductor current Ix to move towards zero and then to a positive value. When the resonant inductor current Ix is equal to the sum of the currents I(Ca), I(Cc) through the first and third input capacitors Ca, Cc the first coupling diode 244 is shut-off. Further, the voltages V(Ca), V(Cc) across the first and third input capacitors Ca, Cc start to increase as the first and third phase currents Ia, Ic apply charges. In response, the voltage V(Cb) across the second input capacitor Cb, presently negative, increases to a zero value. At this point, the fourth diode D4 and the second coupling diode 246 start conducting.

During the entire interval when the second power switch 255 is conducting, the voltage across the second filter capacitor 274 is applied to the primary winding of the isolation transformer 260. The magnitude of the current through the second power switch 255 is the sum of the primary current of the transformer 260 and the resonant inductor current Ix. Power is therefore transferred to the secondary winding of the transformer through the second power switch 250.

Figure 4:
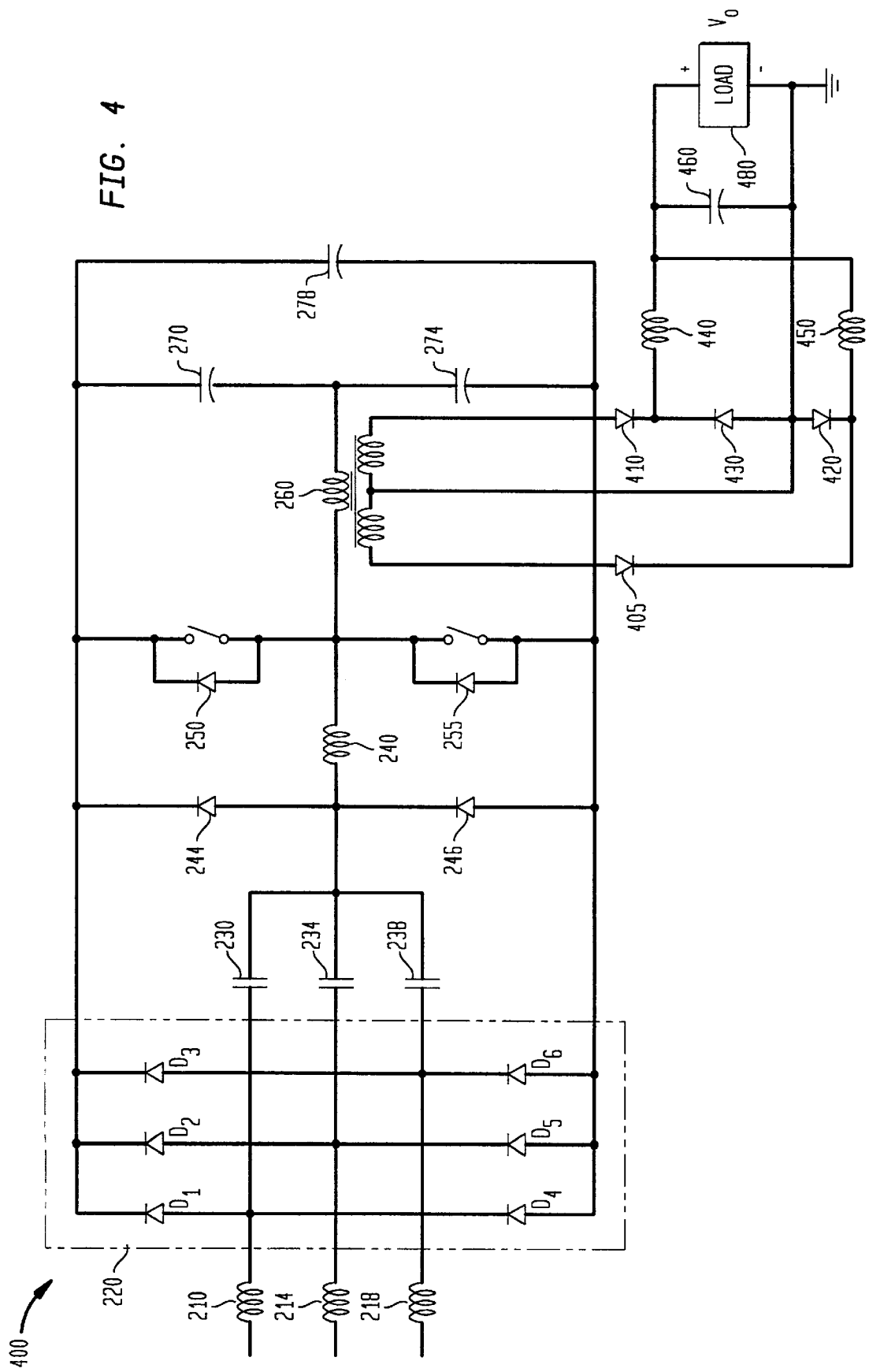
FIG. 4 illustrates another embodiment of a three-phase power converter constructed according to principles of the present invention.

Turning now to FIG. 4, illustrated is another embodiment of a three-phase power converter 400 constructed according to principles of the present invention. The power converter 400 is analogous to that disclosed in FIG. 2 except that the element configurations coupled to the secondary winding of the transformer 260 in the output stage employ split output inductors to reduce the DC-link voltage stress.

In the output stage, the outer taps of the secondary winding of the isolation transformer 260 are coupled to first and second rectifying diodes 405, 410, which are further coupled to first and second split output inductors 450, 440, respectively. Third and fourth rectifying diodes 420, 430 are included in the output rectifier and are coupled between the first and second rectifying diodes 405, 410 and the center tap of the secondary winding of the isolation transformer 260. An output capacitor 460 is coupled between the first and second split output inductors 450, 440 and the center tap of the secondary winding of the transformer 260. Finally, a load 480 is coupled in parallel with the output capacitor 460.

Generally, it is more desirable to control the output voltage of the power converter rather than directly controlling the DC-link voltage within the power converter 400. Consequently, it is critical to limit fluctuations of the DC-link voltage. As a result, it is preferable to operate the output inductor 284 in DCM for a relatively wide load range. Unfortunately, this operation results in high power losses in the output capacitor 460. To overcome this problem, this embodiment employs first and second split output inductors 440, 450. Because of the interleaving of the split output inductors 440, 450, the total current ripple in the output capacitor 460 is reduced. In an advantageous embodiment, the first and second split output inductors 440, 450 can also be coupled together to reduce internal flux swing, and thus inductor core loss.

Figure 5:
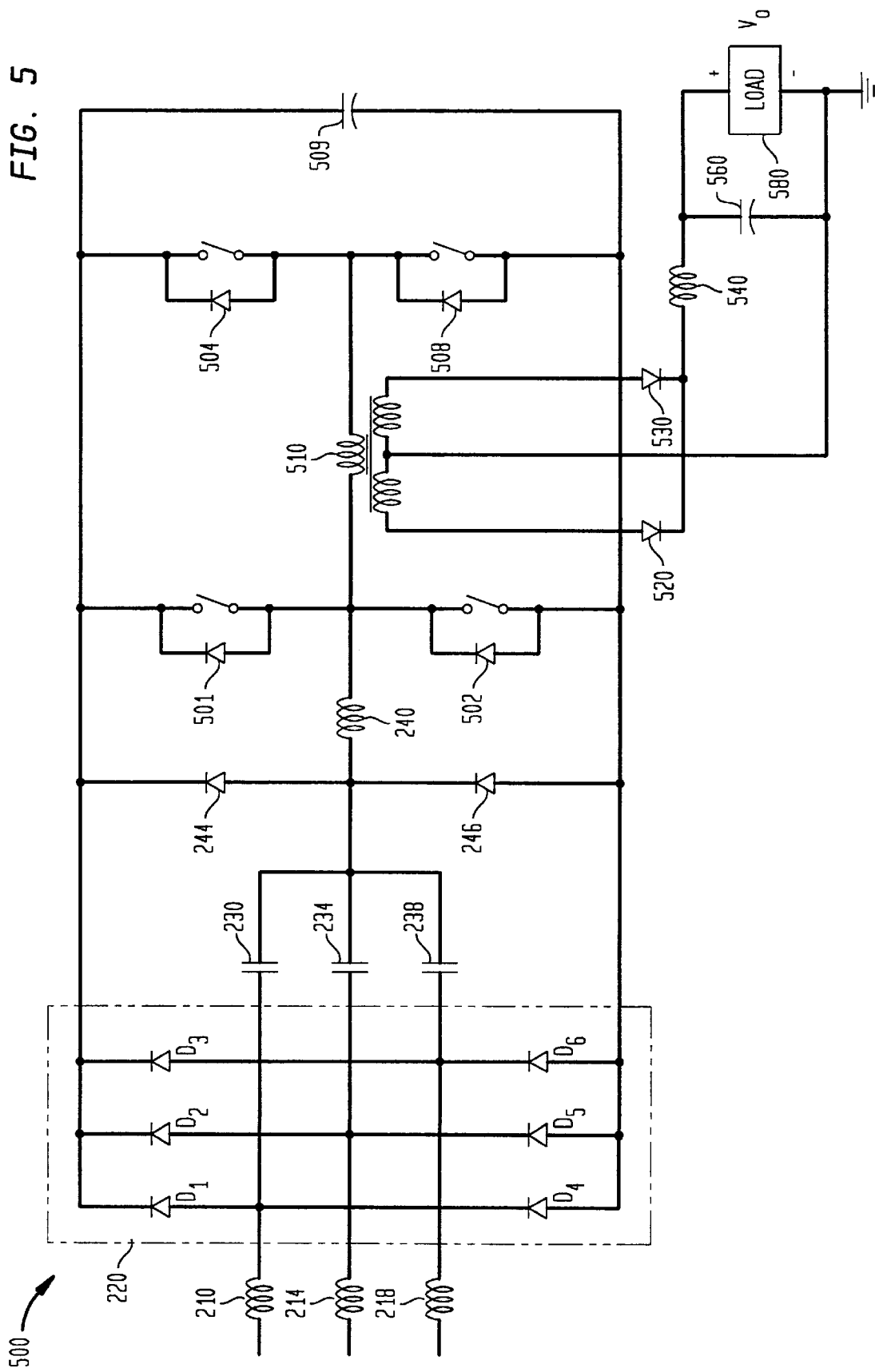
FIG. 5 illustrates yet another embodiment of a three-phase power converter constructed according to principles of the present invention.

Turning now to FIG. 5, illustrated is yet another embodiment of a three-phase power converter 500 constructed according to principles of the present invention. The power converter 500 is also analogous to that disclosed in FIG. 2 except rather than employing two switches in a half-bridge configuration, four switches are used in the output stage in a full-bridge converter configuration. In addition to the advantages disclosed in the previous embodiments, this power converter 500, with such a full-bridge configuration, can be advantageously employed in higher power applications.

In this embodiment, the resonant inductor 240 in the input stage is coupled to a node between first and second power switches 501, 502, which are further coupled to the positive rail and to the negative rail of the rectifier 220, respectively. In the output stage, the primary winding of an isolation transformer 510 is coupled to the node between the first and second power switches 501, 502 and to a node between third and fourth power switches 504, 508. Additionally, a filter capacitor 509 is coupled across the third and fourth switches 504, 508.

First and second rectifying diodes 520, 530 form an output rectifier and are coupled between the outer taps of a secondary winding of an isolation transformer 510 and an output inductor 540. An output capacitor 550 is coupled to the output inductor 540 and to the center tap of the secondary winding of the transformer 510. Finally, a load 560 is coupled in parallel with the output capacitor 550. Those skilled in the art will readily recognize that other converter topologies are well within the broad scope of the present invention.

Figure 6:
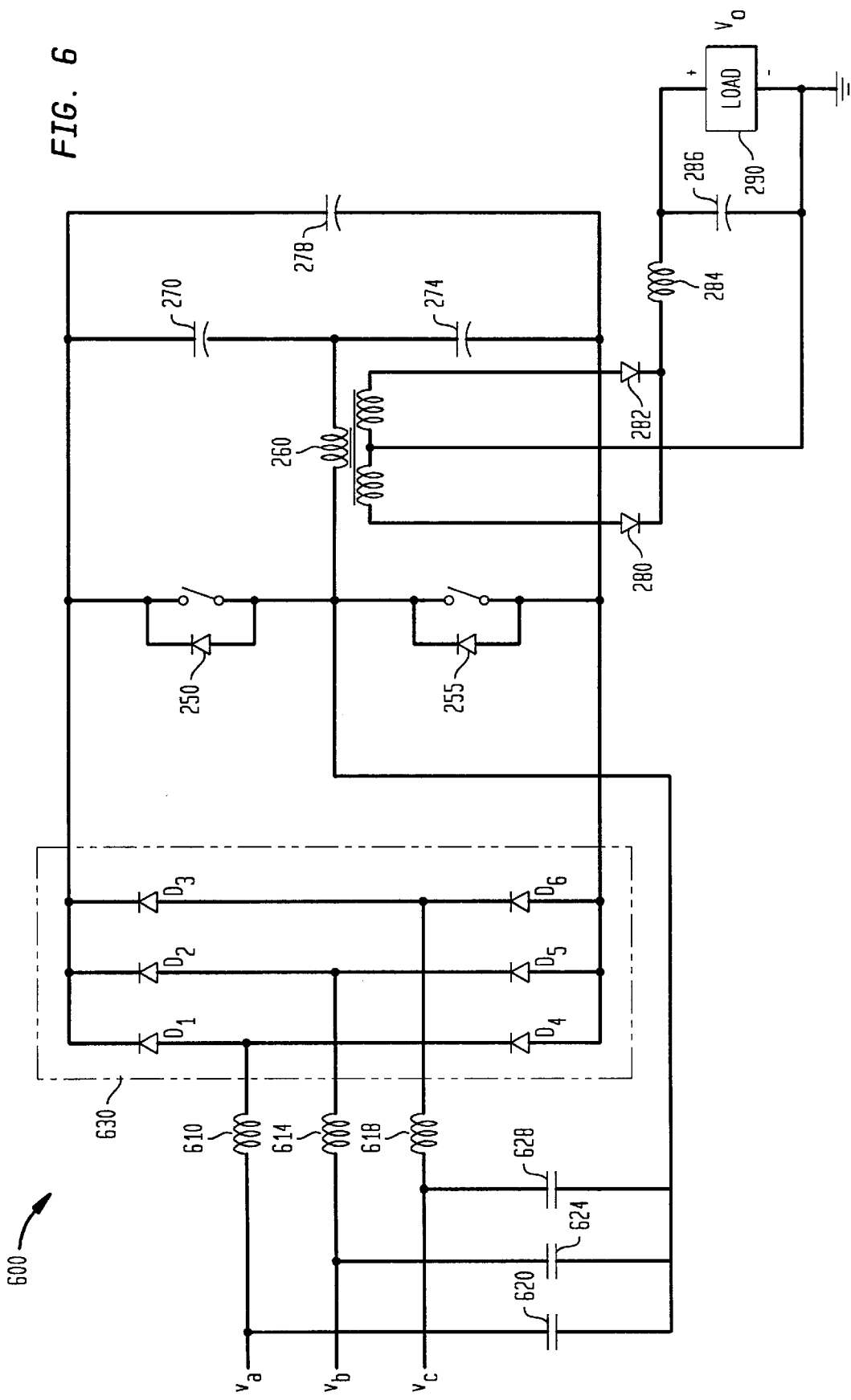
FIG. 6 illustrates yet another embodiment of a three-phase power converter constructed according to principles of the present invention.

Turning now to FIG. 6, illustrated is another embodiment of a three-phase power converter 600 constructed according to principles of the present invention. The power converter 600 operates in a fashion analogous to the power converter 200 disclosed in FIG. 2, except that the input stage employs a different PFC configuration.

The input stage of the power converter 600 receives input power from a AC voltage source in three phases Va, Vb, Vc through first, second and third boost inductors 610, 614, 618 that are coupled to a rectifier 630, which includes a plurality of diodes D1–D6 arranged in a full bridge configuration. Those skilled in the art should readily appreciate that, in other advantageous embodiments, controllable switches may be used in place of the diodes D1–D6 in the rectifier 630.

Additionally, in this embodiment, first, second and third input capacitors 620, 624, 628 are coupled in a wye (Y) configuration with the first, second and third boost inductors 610, 614, 618 between the input of the power converter 600 and a node between the first and second switches 250, 255. The first, second and third Y-connected input capacitors 620, 624, 628 should be large enough so that the respective voltages hold steady over a switching cycle, yet small enough not to carry large low frequency currents. Those skilled in the art will recognize that other PFC configurations may be employed in the input stage and be within the broad scope of the present invention.

While specific embodiments of a three-phase power converter and method for operating the same have been illustrated and described, other embodiments are well within the broad scope of the present invention. For a better understanding of three-phase power converters, in general, see "Principles of Power Electronics" by John G. Kassakian, et al., Addison Wesley, Inc. (1991), and for PFC topologies, see, "Resonant Boost Input Three Phase Power Factor Corrector" by Weng and Yuvarajan, pp. 958–962, Proceedings of APEC 98 (1998), U.S. patent application Ser. No. [Ser. No. 09/118549], filed Jul. 17, 1998, entitled "THREE-PHASE BOOST CONVERTER HAVING MULTIPLE L-C BRANCHES AND METHOD OF OPERATION THEREOF" by Yimin Jiang and Hengchun Mao, U.S. patent application Ser. No. [Ser. No. 09/118550], filed Jul. 17, 1998, entitled "THREE-PHASE BOOST CONVERTER HAVING WYE-CONNECTED INPUT CAPACITORS AND METHOD OF OPERATION THEREOF" by Yimin Jiang and Hengchun Mao and U.S. patent application Ser. No. [Ser. No. 09/118110], filed Jul. 17, 1998, entitled "A SWITCHING NETWORK AND METHOD OF REDUCING INPUT CURRENT TOTAL HARMONIC DISTORTION FOR A BOOST CONVERTER" by Yimin Jiang and Hengchun Mao, which are all incorporated herein by reference.

Although the present invention has been described in detail, those skilled in the art should understand that they can make various changes, substitutions and alterations herein without departing from the spirit and scope of the invention in its broadest form.

What is claimed is:

1. An integrated three-phase power converter having first, second and third phase inputs and an output, comprising:
   first and second power switches coupled between corresponding rails of said power converter;
   an input stage, including first, second and third L-C branches coupled between said first, second and third phase inputs and a node between said first and second power switches, adapted to receive phase voltages from a source of electrical power; and
   an output stage, coupled to said node, that provides a DC output voltage at said output, said first and second power switches cooperating to employ said input stage to reduce input current total harmonic distortion (THD) on all three of said phase inputs and said output stage to convert said phase voltages to said DC output voltage.

2. The power converter as recited in claim 1 wherein said output stage comprises an isolation transformer interposed between said node and said output.

3. The power converter as recited in claim 1 wherein said output stage comprises an output rectifier interposed between said node and said output.

4. The power converter as recited in claim 1 wherein said input stage further comprises an input rectifier coupled to said first, second and third L-C branches.

5. The power converter as recited in claim 1 wherein said first and second power switches each conduct for a duty cycle of about 50%.

6. The power converter as recited in claim 1 wherein said output stage comprises an output inductor coupled to said output.

7. The power converter as recited in claim 1 wherein said output stage comprises first and second split output inductors coupled to said output.

8. The power converter as recited in claim 1 wherein said output stage comprises an output capacitor coupled across said output.

9. The power converter as recited in claim 1 further comprising third and fourth power switches coupled to said first and second power switches.

10. The power converter as recited in claim 1 further comprising third and fourth power switches coupled to said first and second power switches, said first and third power switches adapted to conduct during a first interval for a duty cycle of about 50% and second and fourth power switches adapted to conduct during a second interval for a duty cycle of about 50%.

11. A method of operating an integrated three-phase power converter having, first, second and third phase inputs and an output, comprising:
   coupling first and second power switches between corresponding rails of said power converter;
   receiving phase voltages from a source of electrical power at an input stage that includes first, second and third L-C branches coupled between said first, second and third phase inputs and a node between said first and second power switches;
   coupling an output stage, between said node and said output; and
   controlling said first and second power switches to employ said input stage to reduce input current total harmonic distortion (THD) on all three of said phase inputs and said output stage to convert said phase voltages to a DC output voltage for delivery to said output.

12. The method as recited in claim 11 further comprising coupling an isolation transformer between said node and said output.

13. The method as recited in claim 11 further comprising employing an output rectifier to provide said DC output voltage.

14. The method as recited in claim 11 further comprising rectifying said phase voltages with an input rectifier.

15. The method as recited in claim 11 wherein said controlling further comprises inducing said first and second power switches to conduct for a duty cycle of about 50%.

16. The method as recited in claim 11 further comprising coupling an output inductor to said output.

17. The method as recited in claim 11 further comprising coupling first and second split output inductors to said output.

18. The method as recited in claim 11 further comprising coupling an output capacitor across said output.

19. The method as recited in claim 11 further comprising coupling third and fourth power switches to said first and second power switches.

20. The method as recited in claim 11 further comprising coupling third and fourth power switches to said first and second power switches, said controlling further comprising inducing said first and third power switches to conduct during a first interval for a duty cycle of about 50% and inducing said second and fourth power switches to conduct during a second interval for a duty cycle of about 50%.

* * * * *